United States Patent
Ono et al.

(10) Patent No.: US 6,757,254 B2
(45) Date of Patent: *Jun. 29, 2004

(54) ATM SWITCHING APPARATUS APPLICABLE TO SHORT CELL

(75) Inventors: Hideaki Ono, Kawasaki (JP); Ryuichi Takechi, Kawasaki (JP); Toru Fujisawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/195,024

(22) Filed: Jul. 12, 2002

(65) Prior Publication Data

US 2002/0181473 A1 Dec. 5, 2002

Related U.S. Application Data

(63) Continuation of application No. 09/159,379, filed on Sep. 23, 1998, now Pat. No. 6,483,810.

(30) Foreign Application Priority Data

Mar. 20, 1998 (JP) .............................................. 10-71784

(51) Int. Cl.⁷ .............................................. H04L 12/56
(52) U.S. Cl. ................ 370/244; 370/395.6; 370/395.71
(58) Field of Search .............................. 370/244, 395.1, 370/395.3, 395.6, 395.7, 395.71

(56) References Cited

U.S. PATENT DOCUMENTS

| 5,909,428 | A | | 6/1999 | Saito et al. |
| 6,021,135 | A | | 2/2000 | Ishihara et al. |
| 6,483,810 | B1 | * | 11/2002 | Ono et al. .................. 370/244 |
| 6,490,286 | B1 | * | 12/2002 | Ono et al. ............. 370/395.31 |
| 6,671,289 | B1 | * | 12/2003 | Tamura et al. .............. 370/474 |

FOREIGN PATENT DOCUMENTS

JP          8-086576          7/1996

* cited by examiner

*Primary Examiner*—Melvin Marcelo
(74) *Attorney, Agent, or Firm*—Katten Muchin Zavis Rosenman

(57) ABSTRACT

An ATM switching apparatus applicable to a short cell including an ATM-SW outputting a cell from an output path corresponding to a cell identifier, an interface unit, a demultiplexer, and a multiplexer. The interface unit sets, when a cell storing a plurality of short cells is inputted, the cell identifier so that the cell is transmitted from ATM-SW to the demultiplexer, and outputs the cell toward the ATM-SW. The demultiplexer receives the cell and produces a plurality of partial fill cells, and outputs them, while setting an identifier of each partial fill cell, the partial fill cell is outputted. The multiplexer receives a plurality of the partial fill cells, produces a cell storing a plurality of the short cells in accordance with the identifiers and outputs the cell to the ATM-SW.

11 Claims, 12 Drawing Sheets

FIG.11 PRIOR ART

| ABBREVIATION | NUMBER OF BITS | CONTENTS | REMARKS |
|---|---|---|---|
| VPI | 12 | VIRTUAL PATH IDENTIFIER | |
| VCI | 16 | VIRTUAL CHANNEL IDENTIFIER | |
| PTI | 3 | PEYLOAD TYPE IDENTIFIER | |
| CLP | 1 | CELL LOSS PRIORITY | |
| HEC | 8 | HEADER ERROR CONTROL | |
| OSF | 6 | OFF SET FIELD (SHORT CELL INITIAL POINTER) (0-47) OSF=0: SHORT CELL MAPPING IMMEDIATELY AFTER START FIELD OSF=47: NO DISCONNECTION IN SHORT CELL IN SUBJECT CELL | DO NOT USE OSF=48 OR MORE |
| SN | 1 | 1 BIT SEQUENCE NUMBER (0, 1, 0, 1,·) | MODULO 2 |
| P | 1 | PARITY (ODD PARITY WITH RESPECT TO 7 BITS, START POINTER, SN TOTAL) | |
| CID | 8 | SHORT CELL CONNECTION IDENTIFIER | |
| LI | 6 | SHORT CELL PAYLOAD LENGTH INDICATION (0-44) (0: MEANS PAYLOAD LENGTH 1 BYTE) | |
| UUI | 2 | USER-USER IDENTIFICATION (HIGH-ORDER SIDE) | |
| UUI | 3 | USER-USER IDENTIFICATION (LOW-ORDER SIDE) | |
| S-HEC | 5 | SHORT CELL HEADER ERROR CONTROL (PRODECING POLYNOMIAL X RAISED TO FIFTH POWER + X RAISED TO SECOND POWER + 1) | |

US 6,757,254 B2

ATM SWITCHING APPARATUS APPLICABLE TO SHORT CELL

This application is a continuation of Ser. No. 09/159,379, filed Sep. 23, 1998, now U.S. Pat. No. 6,483,810.

BACKGROUND OF THE INVENTION

1. Field of the Invention

The present invention relates to an asynchronous transfer mode (ATM) switching apparatus applicable to a short cell suitable for transferring low-bit rate information.

2. Description of Related Art

Upon carrying out communications by the ATM, data is loaded in a payload which is called an ATM cell which is a unit of data switching. The ATM cell is transmitted throuh an ATM connection setting previously. The ATM cell, when transmitted within the ATM network, is allocated with one destination information (virtual path identifier/virtual channel identifier (VPI/VCI)) per ATM connection. The VPI/VCI are loaded in the header of the ATM cell. The ATM cell is transmitted through the ATM connection corresponding to the VPI/VCI.

In the technical field relating to mobile communication, data is converted into a compressed low-bit rate data format for its transmission so that a communication band may effectively be used. If the low-speed bit rate information is loaded a payload of a standard ATM cell, much time require so that the payload of one ATM cell is filled with data. For this reason, there is a fear that there occurs a delay in data transmission and a drop in communication quality.

Under the above circumstances, a multiplexing transfer system called AAL Type 2 (hereinafter referred to as AAL2) as a system capable of transmitting low-bit rate information with less delay has been investigated while focusing on ITU-T.

FIGS. 10 and 11 are diagrams showing AAL2 formats. FIG. 12 is a diagram showing a concept of a transfer system according to the AAL2. In FIG. 10(A), the header of an AAL type 2 format cell (hereinafter referred to as AAL2 cell) has a format in which each field (start field: 1 byte) of OSF, SN, P is newly added to the format of a header of a standard cell.

A short cell also consists of a fixed-length short cell header and a variable-length short cell payload. A short cell connection identifier (CID) for identifying a short cell connection and a length indicator (LI) showing the payload length of the short cell are embedded in the short cell header.

Information of the low-bit rate described above is embedded in the short cell payload. A plurality of short cells are stored in the AAL2 cell. In this case, when a part of the short cells is not stored in the payload of a single AAL2 cell, as shown in FIG. 12, the remaining parts of the short cells are mapped in the subsequent AAL2 cell (called overlapping). Then, the AAL2 cell is transmitted on a given ATM connection in accordance with VPI/VCI stored in the AAL2 cell header. Hereinafter, □AAL2 cell□ is prescribed to be meant by an AAL2 cell storing a plurality of short cells.

However, upon transmitting the AAL2 cell by using the ATM connection as described above, there occurred the following problems. Namely, a plurality of short cells having different CIDs are multiplexed in the payload of the AAL2 cell. Therefore, each short cell is not transmitted to a desired destination unless an ATM switching apparatus carries out switching per short cell. However, conventional ATM switching apparatuses are not incorporated with a function of processing the short cells embedded in the payload of the ATM cell. Therefore, switching per short cell could not be carried out.

Thus, the ATM switching apparatus has to have a function of switching per short cell. In this case, preferably, the ATM switching apparatus has a configuration to process the ALL2 cell to thereby carry out the switching per short cell, in order to make the configuration required for materializing the function simple.

Then, in the ATM switching apparatus, by extracting a plurality of short cells from the AAL2 cell inputted into the ATM switching apparatus itself, producing a plurality of ATM standard cells (hereinafter referred to as partial fill cell: see FIG. 10(B)) in which each short cell is stored in the payload one by one, and carrying out switching per partial fill cell, it enables switching per short cell.

In view of the above, the present inventors have filed a patent application, before filing this application, in which an apparatus for demultiplexing the AAL2 cell into a plurality of partial fill cells (short cell demultiplexer), and an apparatus for multiplexing a AAL2 cell from a plurality of partial fill cells (short cell multiplexer) are disclosed (Japanese Patent Application Laid-open No. Hei 8-332319, hereinafter referred to as prior application).

However, in the prior application, the formats of cells to be inputted into the short cell demultiplexer and the short cell multiplexer are different with each other. For that reason, even if those apparatuses disclosed in the prior application are installed in an ATM switching apparatus, the formats of the cells to be inputted/outputted into/from the ATM switching apparatus are not made coincide with each other.

It is also expected that cells other than the AAL2 format may be inputted to the ATM switching apparatus. Accordingly, it is preferred that the ATM switching apparatus is so arranged as being capable of handling various format of cells.

In addition, when the ATM switching apparatus carries out the switching operation for per short cell, it is preferable that the ATM switching apparatus includes means for ensuring the normality of its operation. However, the ensuring means for the switching operation for the short cell has not yet been established with respect to the AAL2.

SUMMARY OF THE INVENTION

The present invention has been made in view of the above-mentioned problems, and has an object of the present invention to provide an ATM switching apparatus applicable to a short cell, in which switching per short cell can be made, and formats of the cells to be inputted/outputted can be made coincide with each other.

To solve the above-mentioned problems, the present invention employs the following arrangement. Namely, in the present invention, an ATM switching apparatus applicable to the short cell is comprised of an ATM switch for outputting a cell inputted thereinto from an output path corresponding to its identifier, an interface unit, a demultiplexer, and a multiplexer, which are connected to the ATM switch. In the ATM switching apparatus according to the present invention, when a cell in which a plurality of short cells are stored, is inputted to the interface unit, the interface unit outputs the cell to the ATM switch, while setting an identifier of the cell so that the cell is then outputted to the demultiplexer. The demultiplexer also receives the cell outputted from the interface unit through the ATM switch to produce a plurality of standard cells in which a plurality of short cells stored in the cell are stored one by one, and outputs the standard cells to the ATM switch, while setting the identifiers of the standards cells so that the standard cells are then outputted to the multiplexer. The multiplexer also receives a plurality of standard cells outputted from the demultiplexer through the ATM switch to produce a cell storing a plurality of short cells in accordance with the identifiers of the standard cells, and outputs the cell to the ATM switch, while setting the identifier of the cell so that the cell is then outputted from a predetermined output path.

According to the ATM switching apparatus of the present invention, it is capable of carrying out a switching process for per short cell by using the ATM switch carrying out a switching process for an ordinary ATM cell. The cell storing a plurality of the short cells is an AAL Type 2 format cell, for example. Further, the interface unit, the demultiplexer, and the multiplexer may be composed of an electric circuit such as an IC and an LSI and a processor system mainly consisting of a CPU and a memory.

BRIEF DESCRIPTION OF THE DRAWINGS

In the accompanying drawings:

FIG. 11 is a table illustrating formats of AAL Type 2 cell and short cell; and

DETAILED DESCRIPTION OF THE PREFERRED EMBODIMENT

Now, embodiments of the present invention will be described with reference to the drawings.

EMBODIMENT 1

Figure 1:
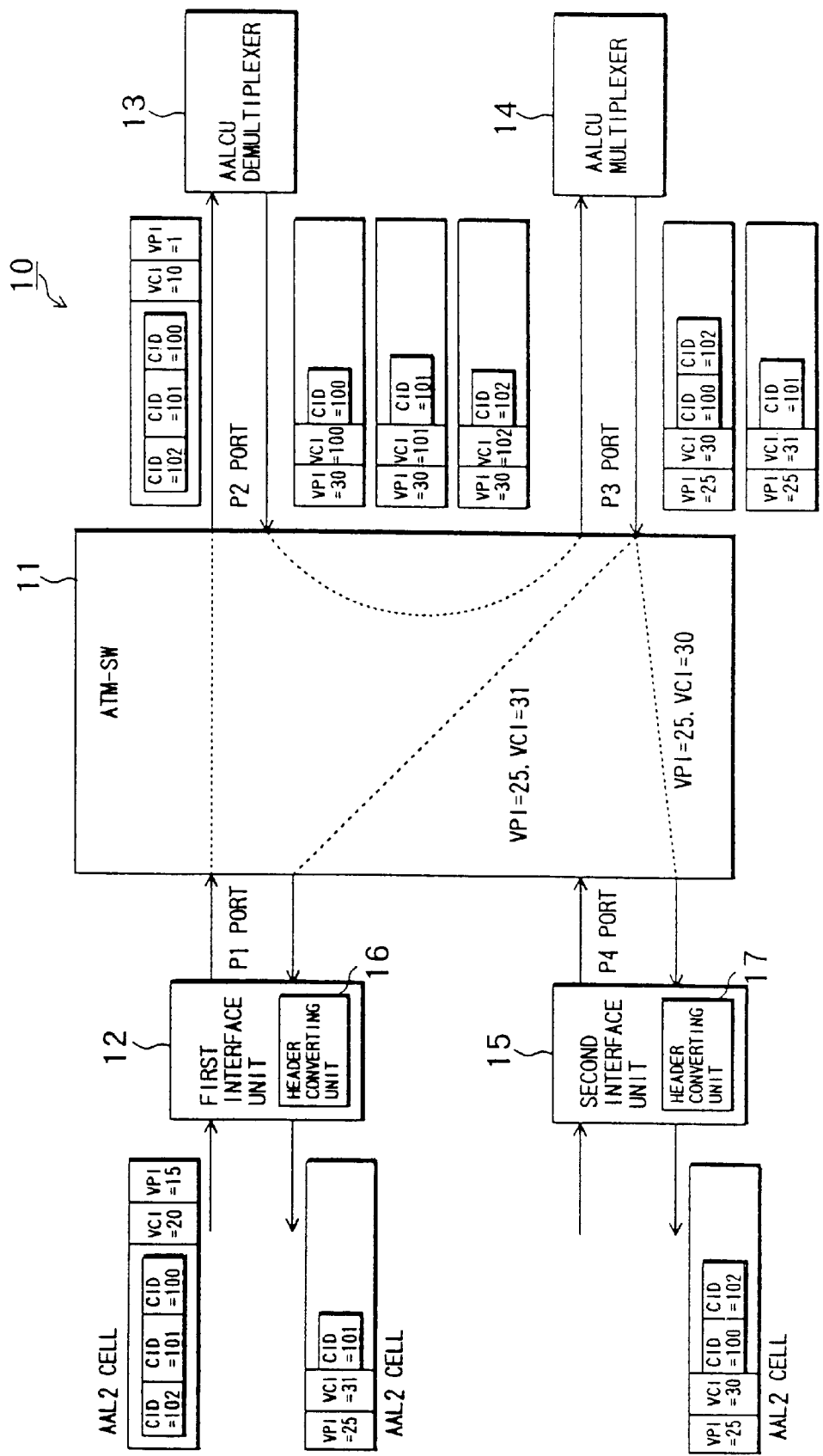
FIG. 1 is a diagram showing an ATM switching apparatus applicable to a short cell in accordance with a first Embodiment of the present invention.

FIG. 1 is a diagram showing an ATM switching apparatus 10 applicable to a short cell in accordance with the Embodiment 1. In FIG. 1, an ATM switching apparatus 10 is comprised of an ATM-SW (self routing switch:ATM switch) 11, a first interface unit 12 connected to a P1 port of the ATM-SW 11, an AALCU demultiplexer (hereinafter referred to as demultiplexer) 13 connected to a P2 port of the ATM-SW 11, an AALCU multiplexer (hereinafter referred to as multiplexer) 14 connected to a P3 port of the ATM-SW 11, and a second interface unit 15 connected to a P4 port of the ATM-SW 11.

The ATM-SW 11 refers to VPI/VCI of a cell inputted thereinto, and outputs the cell from a given port. More specifically, a cell of VPI=1, VCI=10 is outputted from the P2 port; a cell of VPI=30 is outputted from the P3 port; a cell of VPI=25, VCI=31 is outputted from the P1 port; and a cell of VPI=25, VCI=30 is outputted from the P4 port.

An AAL2 cell (VPI=15, VCI=20) storing a plurality of short cells is inputted to the first interface unit 12. In the present embodiment, the AAL2 cell storing a short cell having any one of CID numbers 100, 101, and 102 is inputted to the first interface unit 12.

The first interface unit 12 has a header converting unit 16. The header converting unit 16 converts the VPI/VCI of the cell inputted to the first interface unit 12 into VPI=1, VCI=10. The first interface unit 12 outputs the AAL2 cell (VPI=1, VCI=10) which is header conversion-processed, to the ATM-SW 11.

In addition, the first interface unit 12 receives the AAL2 cell of VPI=25, VCI=31 from the ATM-SW 11. In this case, the header converting unit 16 converts the VPI/VCI of the inputted AAL2 cell into a value that is negotiated between the header converting unit 16 and the destination of the cell. However, in this embodiment, it is to be noted that the header converting unit 16 converts the VPI/VCI of the AAL2 cell into the same value. The first interface unit 12 then outputs the AAL2 cell (VPI=25, VCI=31) which is header conversion-processed, to an ATM connection corresponding to the VPI/VCI.

The demultiplexer 13 is a short cell demultiplexer disclosed in the prior application. The demultiplexer 13 receives the AAL2 cell (VPI=1, VCI=10) outputted from the ATM-SW 11, and produces a plurality of partial fill cells storing one by one a plurality of short cells stored in the AAL2 cell.

In this case, the demultiplexer 13 sets the VPI of each partial fill cell to VPI=30. The demultiplexer 13 then refers to the CID of the short cell, sets the VCI of the partial fill cell storing the short cell of CID=100 to VCI=100, sets the VCI of the partial fill cell storing the short cell of CID=101 to VCI=101, and sets the VCI of the partial fill cell storing the short cell of CID=102 to VCI=102. The demultiplexer 13 then transmits each partial fill cell to the ATM-SW 11.

The multiplexer 14 is a short cell multiplexer disclosed in the prior application. The multiplexer 14 receives a plurality of partial fill cells outputted from the ATM-SW 11, multiplexes a plurality of short cells stored in each partial fill cell, and produces an AAL2 cell storing the multiplexed short cells.

In this case, the multiplexer 14 multiplexes the short cells in accordance with the VCI of the partial fill cell. Namely, the short cells stored in the partial fill cells of VCIs=100, 102 are multiplexed on the payload of the AAL2 cell of VPI=25, and VCI=30. The short cells stored in the partial fill cell of VCI=101 are multiplexed on the payload of the AAL2 cell of VPI=25, VCI=31. The multiplexer 14 then outputs the produced AAL2 cell to the ATM-SW 11.

The second interface unit 15 has the same arrangement as that of the first interface unit 12. The second interface unit 15 receives the AAL2 cell from the ATM-SW 11. The second interface unit 15 has a header converting unit 17. The header converting unit 17 converts the VPI/VCI of the AAL2 cell inputted to the second interface unit 15 into desired VPI/VCI (VPI/VCI negotiated with the destination of the cell.) However, in the Embodiment 1, the header converting unit 17 converts the VPI/VCI of the AAL2 cell inputted to the second interface unit 15 into the same VPI/VCI.

Then, the second interface unit 15 outputs the AAL2 cell processed by the header converting unit 17 to a given ATM connection. The first and the second interface units 12 and 15 may be composed of an electric circuit such as an IC, an LSI, and an ASIC and a processor mainly consisting of a CPU and a memory.

The operation of the ATM switching apparatus 10 is described below. Namely, for example, when an AAL2 cell storing three short cells having CIDs=100, 101, 102 are inputted to the first interface unit 12, the first interface unit 12 converts the VPI/VCI of the AAL2 cell into VPI=1, VCI=10 by the header converting unit 16 and outputs the AAL2 cell to the ATM-SW 11.

When the AAL2 cell outputted from the first interface unit 12 is inputted to the ATM-SW 11, the ATM-SW 11 outputs the AAL2 cell to the demultiplexer 13 in accordance with the VPI/VCI.

When the AAL2 cell sent from the ATM-SW 11 is inputted to the demultiplexer 13, the demultiplexer 13 produces three partial fill cells from the AAL2 cell, sets the VPI of each partial fill cell to VPI=30, sets the VCI of each partial fill cell to the same number as that of the CID of the short cell, and outputs each partial fill cell to the ATM-SW 11.

When each partial fill cell outputted from the demultiplexer 13 is inputted to the ATM-SW 11, the ATM-SW 11 refers to the VPI/VCI, and outputs each partial fill cell to the multiplexer 14.

When the partial fill cell outputted from the ATM-SW 11 is inputted to the multiplexer 14, the multiplexer 14 multiplexes the short cell stored in the partial fill cell of VCI=100 and VCI=102 on the payload of the AAL2 cell of VPI=25 and VCI=30. Meanwhile, the short cell stored in the partial fill cell of VCI-101 is multiplexed on the payload of the AAL2 cell of VPI=25, VCI=31. The multiplexer 14 outputs each AAL2 cell to the ATM-SW 11.

When the AAL2 cell outputted from the multiplexer 14 is inputted to the ATM-SW 11, the ATM-SW 11 outputs the AAL2 cell of VPI=25, VCI=30 to the second interface unit 15, and outputs the AAL2 cell of VPI=25, VCI=31 to the first interface unit 12.

When the AAL2 cell outputted from the ATM-SW 11 is inputted to the first interface unit 12, the first interface unit 12 outputs the AAL2 cell to the ATM connection of VPI=25, VCI=31. Meanwhile, when the AAL2 cell outputted from the ATM-SW 11 is inputted to the second interface unit 15, the second interface unit 15 outputs the AAL2 cell to the ATM connection of VPI=25, VCI=30.

The ATM switching apparatus 10 in accordance with the Embodiment 1 of the present invention demultiplexes the AAL2 cell inputted thereinto, into a plurality of partial fill cells and multiplexes the short cells in accordance with the CIDs of the short cells in the partial fill cells. Namely, since the short cells having a same destination are multiplexed, the ATM-SW 11 may carry out the switching per short cell. In addition, the format of the cells inputted/outputted into/from the ATM switching apparatus 10 may be made coincide by the format of AAL2.

In should be noted that the values of the VPIs/VCIs to be set by the header converting unit 16, the demultiplexer 13, and the multiplexer 14, respectively, may select arbitrary values so long as the cell is to be outputted from an appropriate port by the ATM-SW 11.

EMBODIMENT 2

Figure 2:
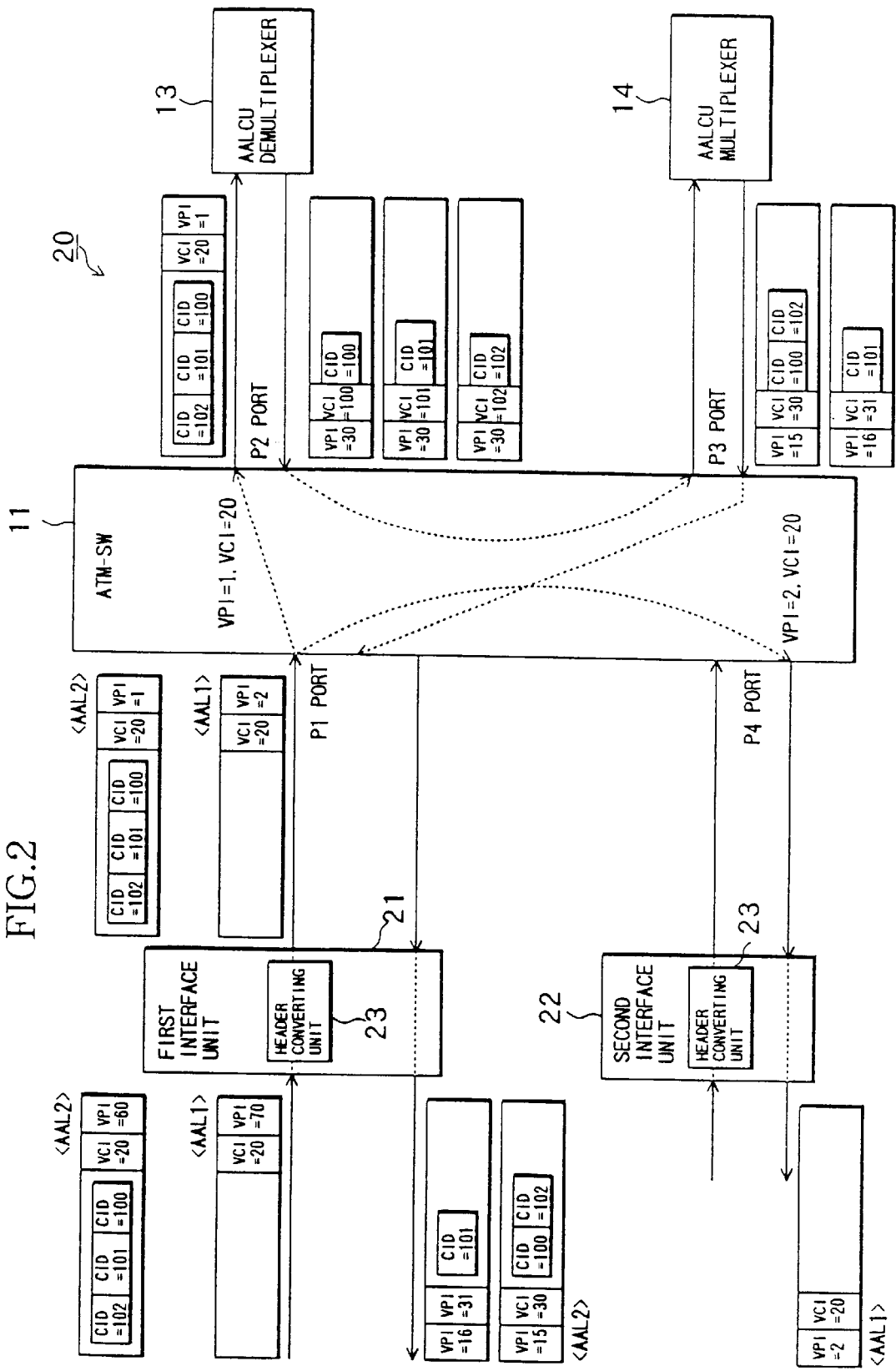
FIG. 2 is a diagram showing an ATM switching apparatus applicable to a short cell in accordance with a second Embodiment of the present invention.

FIG. 2 is a diagramstructural drawing of an ATM switching apparatus 20 applicable to a short cell in accordance with the Embodiment 2 of the present invention. In the ATM switching apparatus 20, an arrangement for processing an AAL Type 1 format cell (hereinafter referred to as AAL 1 cell) is added to the ATM switching apparatus 10 of the Embodiment 1. The ATM switching apparatus 20 differs from the ATM switching apparatus 10 in the following points. Namely, an AAL2 cell (VPI=60, VCI=20) and an AAL 1 cell (VPI=70, VCI=20) are intermingly inputted to a first interface unit 21.

A header converting unit 23 of the first interface unit 21 converts the header of the AAL2 cell inputted to the first interface unit 21 into VPI=1, VCI=20. The header converting unit 23 converts the header of the AAL 1 cell into VPI=2, VCI=20. The first interface unit 21 outputs the cell processed by the header converting unit 23 to the ATM-SW 11.

When the cell outputted from the first interface unit 21 is inputted to the ATM-SW 11, the ATM-SW 11 outputs the cell (AAL2 cell) of VPI=1, VCI=20 to a demultiplexer 13, and outputs the cell (AAL 1 cell) of VPI=2, VCI=20 to a second interface unit 22.

When the AAL2 cell is inputted to the demultiplexer 13, the demultiplexer 13 produces a plurality of partial fill cells from the AAL2 cell as in the Embodiment 1, and outputs each partial fill cell to the ATM-SW 11. The ATM-SW 11 outputs the cell (the cell of VPI=30) inputted from the demultiplexer 13 to a multiplexer 14.

When the partial fill cell outputted from the ATM-SW 11 is inputted to the multiplexer 14, the multiplexer 14 produces an AAL2 cell from the partial fill cells. The VPI/VCI of AAL2 cell are set as follows. Namely, the multiplexer 14 multiplexes the short cells stored in the partial fill cells of VCIs=100, 102 on the payload of the AAL2 cell of VPI=15, VCI=30 to store therein. Meanwhile, the multiplexer 14 multiplexes the short cell stored in the partial fill cell of VCI=101 on the payload of the AAL2 cell of VPI=16, VCI=31 to store therein. The multiplexer 14 then outputs the produced AAL2 cell to the ATM-SW 11.

When the AAL2 cell outputted from the multiplexer 14 is inputted to the ATM-SW 11, the ATM-SW 11 outputs each AAL2 cell to the first interface unit 21. Each AAL2 cell is transmitted on an ATM connection corresponding to VPI/VCI through the first interface unit 21.

According to the Embodiment 2, the AAL2 cell inputted to the ATM switching apparatus 20 is converted by the first interface unit 21 so that the VPI/VCI of the AAL2 cell become the processing number of the demultiplexer 13, and is inputted to the demultiplexer 13 through the ATM-SW 11. In the demultiplexer 13, the VPI of each produced partial fill cell is set to become the processing number (VPI-30) of the multiplexer 14. Each partial fill cell is inputted to the multiplexer 14 through the ATM-SW 11. In the multiplexer 14, VPI/VCI of the produced AAL2 cell are set to numbers (numbers showing the VPI, VCI, CID of an output circuit) outputted from desired ports of the ATM-SW 11. Therefore, the AAL2 cell outputted from the ATM switching apparatus 20 is outputted to a desired ATM connection (output circuit).

Meanwhile, the AAL 1 cell inputted to the ATM switching apparatus 20 is converted into numbers by which the VPI/

VCI of the AAL1 cell are outputted to a desired ATM connection (output circuit) by the first interface unit 21, and is sent to the desired ATM connection through the ATM-SW 11 and the second interface unit 22.

In this way, the ATM switching apparatus 20 according to the Embodiment 2 can carry out switching processes for the AAL cell 1 and the AAL2 cell having different formats. It should be noted that the ATM switching apparatus 20 carries out the above operation even if an AAL Type 5 format cell instead of the AAL 1 cell is inputted to the ATM switching apparatus 20.

EMBODIMENT 3

Figure 3:
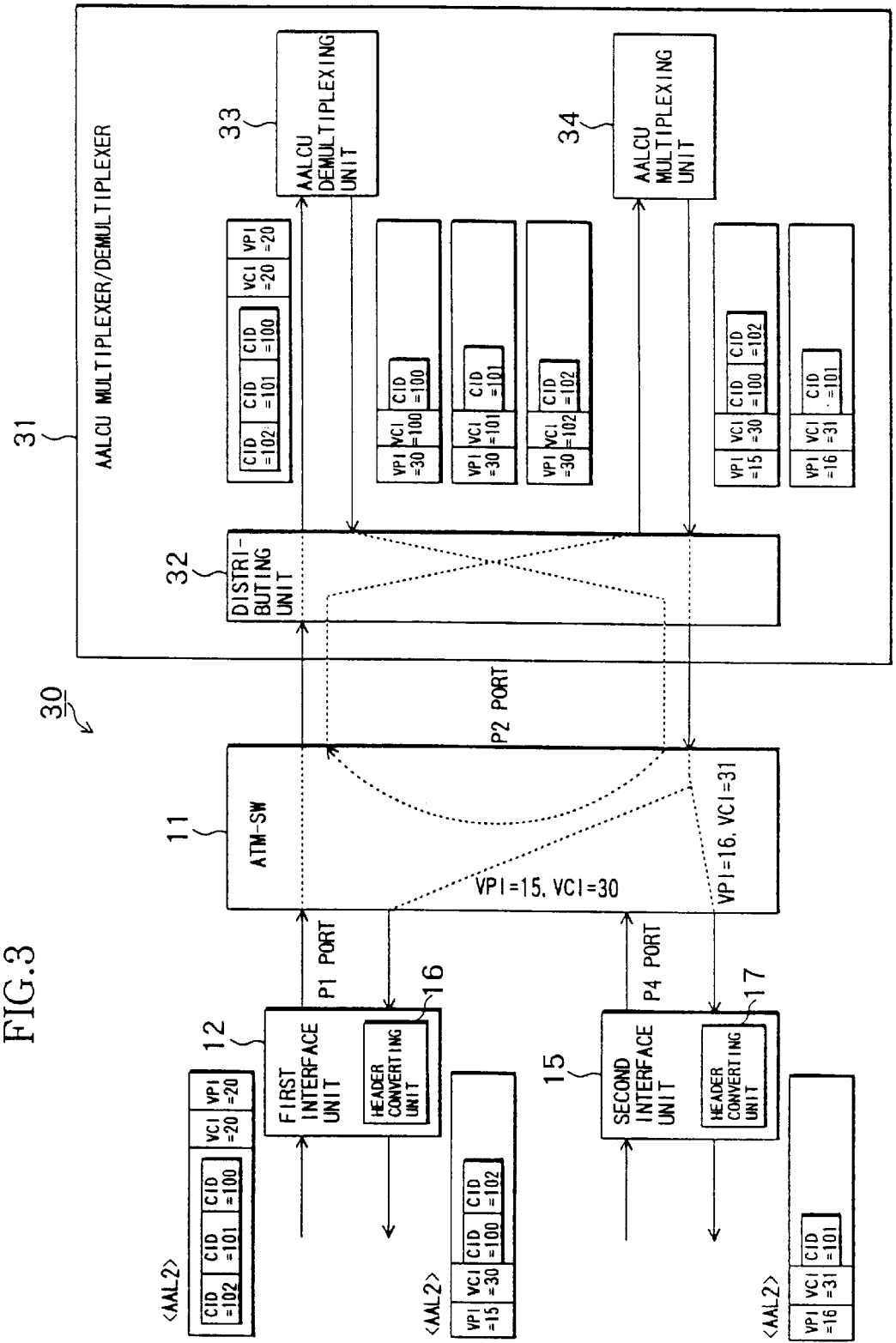
FIG. 3 is a diagram showing an ATM switching apparatus applicable to a short cell in accordance with a third Embodiment of the present invention.

FIG. 3 is a diagram showing an ATM switching apparatus 30 applicable to a short cell in accordance with a Embodiment 3 of the present invention. In FIG. 3, the ATM switching apparatus 30 has an ATM-SW 11, a first interface unit 12, and a second interface unit 15 in the ATM switching apparatus 10 of the Embodiment 1 (see FIG. 1). An AALCU multiplexing/demultiplexing apparatus (hereinafter referred to as multiplexer/demultiplexer) 31 is connected to a P2 port of the ATM-SW 11.

The following settings are applied to the ATM-SW 11. Namely, the ATM-SW 11 outputs a cell having VPI=20, VCI=20 and cells having VPI=30, VCIs=100 to 102 from the P2 port. In addition, the ATM-SW 11 outputs a cell having VPI=15, VCI=30 from a P1 port. Further, the ATM-SW 11 outputs a cell having VPI=16, VCI=31 from a P4 port.

An AAL2 cell (VPI=20, VCI=20) storing a plurality of short cells is inputted to the first interface unit 12. However, a header converting unit 16 converts the VPI/VCI of the AAL2 cell (VPI=20, VCI=20) into the same value. The first interface unit 12 outputs the AAL2 cell Processed by the header converting unit 16 to the ATM-SW 11.

In addition, the first interface unit 12 receives the AAL2 cell of VPI=15, VCI=30 from the ATM-SW 11. The header converting unit 16 converts the VPI/VCI of the AAL2 cell into the same value. The first interface unit 12 then outputs the AAL2 cell that is header conversion-processed, to an ATM connection corresponding to the VPI/VCI.

The multiplexer/demultiplexer 31 consists of a distributing unit 32 connected to the ATM-SW 11, a demultiplexing unit 33 and a multiplexing unit 34 each connected to the distributing unit 32. The distributing unit 32 outputs the cell inputted from the ATM-SW 11 from a given output path in accordance with the VPI/VCI. Namely, the distributing unit 32 outputs the cell of VPI=20, VCI=20 to the demultiplexing unit 33, and outputs the cells of VPI=30, VCIs=100 to 102 to the multiplexing unit 34. Meanwhile, the distributing unit 32 inputs the cell inputted from the demultiplexing unit 33 or the multiplexing unit 34 to the ATM-SW 11.

The demultiplexing unit 33 has a same function as those of the demultiplexer 13 explained in the Embodiment 1 of the present invention. Namely, the demultiplexing unit 33 demultiplexes the AAL2 cell of VPI=20, VCI=20 into a plurality of partial fill cells and sets the VPI of each partial fill cell to VPI=30. Thus, each partial fill cell outputted from the demultiplexing unit 33 is inputted to the multiplexing unit 34 through the distributing unit 32.

The multiplexing unit 34 has the same functions as those of the multiplexer 14 described in the Embodiment 2. The short cells stored in the partial fill cells of VCIs=100, 102 inputted thereinto are multiplexed on the payload of the AAL2 cell having VPI=15, VCI=30, and multiplexes the short cells of the partial fill cell of VCI=101 on the payload of the AAL2 cell having VPI=16, VCI=31. The multiplexing unit 34 then inputs the produced AAL2 cell to the distributing unit 32.

The AAL2 cell outputted from the ATM-SW 11 is inputted to a second interface unit 15. A header converting unit 17 converts the VPI/VCI of the AAL2 cell inputted to the second interface unit 15 into the same value. The second interface unit 15 then outputs the AAL2 cell that is header conversion-processed, to an ATM connection corresponding to the VPI/VCI.

The operation of the ATM switching apparatus 30 is as follows. Namely, the AAL2 cell of VPI=20, VCI=20 inputted to the first interface unit 12 is inputted to the ATM-SW 11. The ATM-SW 11 refers to the VPI/VCI of the AAL2 cell inputted from the first interface unit 12 and outputs the AAL2 cell from the P2 port. Thus, the AAL2 cell is inputted to the distributing unit 32 of the multiplexer/demultiplexer 31.

The distributing unit 32 refers to the VPI/VCI (VPI=20, VCI=20) of the AAL2 cell and outputs the AAL2 cell to the demultiplexing unit 33. The demultiplexing unit 33 carries out the same operation as that of the demultiplexer 13 shown in FIG. 1, and outputs a plurality of partial fill cells to the distributing unit 32. Each partial fill cell is inputted to the ATM-SW 11 through the distributing unit 32.

The ATM-SW 11 refers to the VPI/VCI of each partial fill cell inputted from the distributing unit 32 and inputs each partial cell to the distributing unit 32. The distributing unit 32 refers to the VPI/VCI of each partial fill cell as well as the ATM-SW 11, and inputs each partial cell to the multiplexing unit 34.

The multiplexing unit 34 carries out almost the same operation as that of the multiplexer 14 shown in FIG. 1, and outputs the AAL2 cell having VPI=15, VCI=30 and the AAL2 cell having VPI=16, VCI=31 to the distributing unit 32. These AAL2 cells are inputted to the ATM-SW 11 through the distributing unit 32.

The ATM-SW 11 refers to the VPI/VCI of each AAL2 cell inputted from the distributing unit 32, and outputs the AAL2 cell having VPI=15, VCI=30 from the P1 port, and outputs the AAL2 cell having VPI=16, VCI=31 from the P4 port. The AAL2 cell outputted from the P1 port is outputted to a corresponding ATM connection through the first interface unit 12. The AAL2 cell outputted from the P4 port is outputted to a corresponding ATM connection through the second interface unit 15.

The ATM switching apparatus 30 in the Embodiment 3 of the present invention exerts the same effects as those of the ATM switching apparatus 10 of the Embodiment 1. However, the ATM switching apparatus 30 can reduce the number of ports to be used in the ATM-SW 11 by one compared with the ATM switching apparatus 10. Thus, the ATM switching apparatus 30 is effective when the number of applicable ports of the ATM SW-11 is restricted.

In addition, in the Embodiment 3 of the present invention, the distributing unit 32 refers to the VPI/VCI stored in the cell inputted from the ATM-SW 11, and distributes the cell to any one of the demultiplexing unit 33 or the multiplexing unit 34. Instead of this technique, the following techniques: (a) a technique for independently assigning processing numbers in the multiplexer/demultiplexer 31 to the multiplexing-process and the demultiplexing process; (b) a technique for storing information bits for the distributing process in the specific region of the header of the cell inputted to the distributing unit 32 from the ATM-SW 11 may be employed.

EMBODIMENT 4

Figure 4:
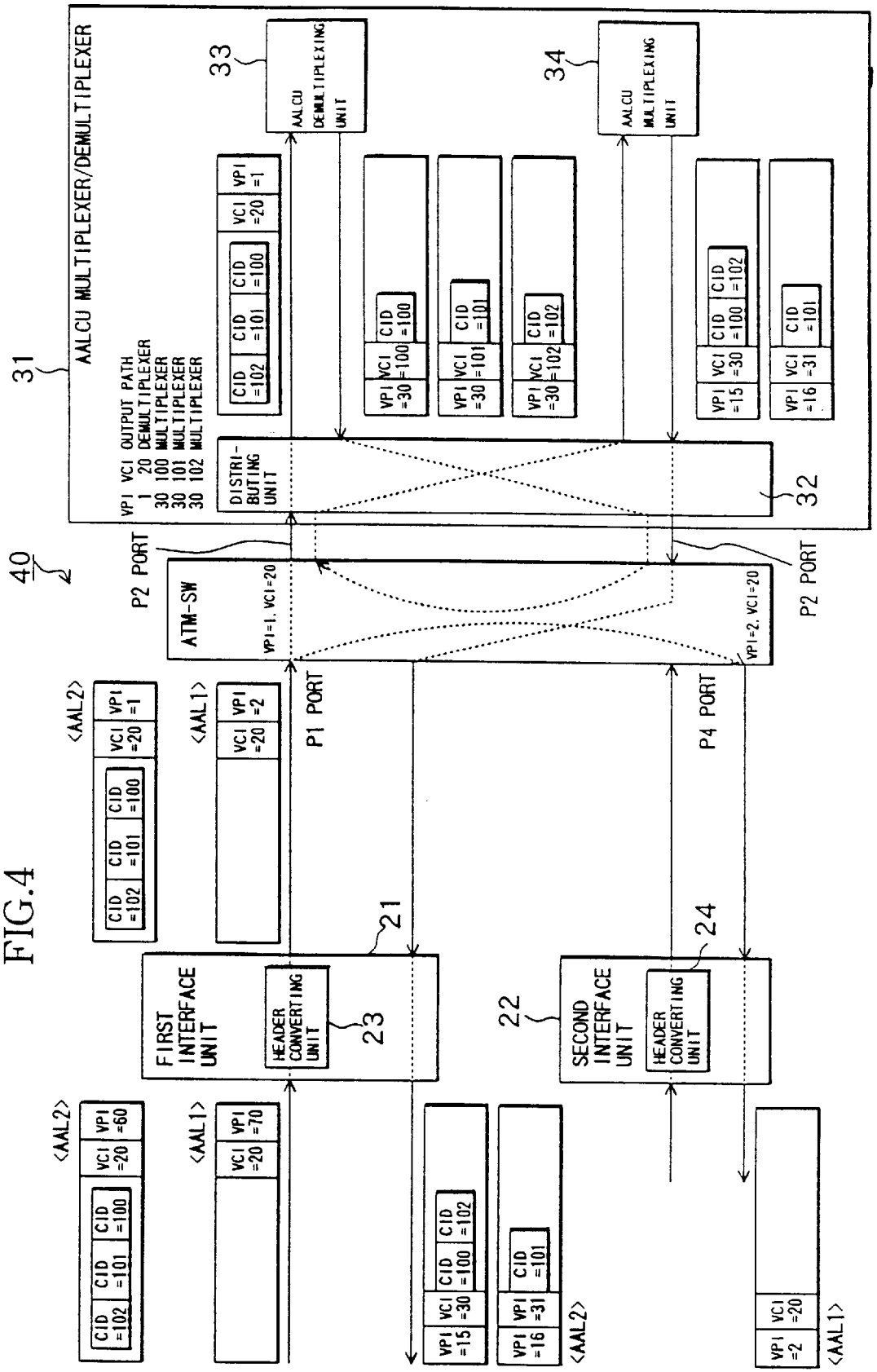
FIG. 4 is a diagram showing an ATM switching apparatus applicable to a short cell in accordance with a fourth Embodiment of the present invention.

FIG. 4 is a diagram showing an ATM switching apparatus 40 applicable to a short cell in accordance with a fourth Embodiment of the present invention. The ATM switching apparatus 40 shown in FIG. 4 is formed by connecting the multiplexer/demultiplexer 31 shown in FIG. 3 to the ATM-SW 11 to which the first interface unit 21, the second interface unit 22 shown in FIG. 2 are connected.

Similar to the Embodiment 2, the AAL2 cell (VPI=60, VCI=20) and the AAL 1 cell (VPI=70, VCI=20) are intermingly inputted to the first interface unit 21. In the ATM switching apparatus 40, the AAL2 cell carries out the same process as that of the ATM switching apparatus 30 of the Embodiment 3 of the present invention, and the AAL 1 cell carries out the same process as that of the ATM switching apparatus 20 according to the Embodiment 2.

Namely, the header converting unit 23 of the first interface unit 21 converts the VPI/VCI of the AAL2 cell into VPI/VCI (VPI=1, VCI=20) to be distributed to the demultiplexing unit 33 by the distributing unit 32 in the multiplexer/demultiplexer 31. The demultiplexing unit 33 assigns VPI/VCI (VPI=30, VCIs=100 to 102) to become the processing number of the multiplexing unit 34. In the multiplexing unit 34, the VPI/VCI of the AAL2 cell is set to the identification number of a desired output port, namely, the VPI, VCI, CID of an output circuit (ATM connection). As a result, the switching per short cell is possible.

The header converting unit 23 of the first interface unit 21 carries out header conversion to a cell (for example, an AAL1 cell) other than the AAL2 cell so that the cell becomes an identification number in the desired output port of the cell, (in this embodiment, converted to VPI=2, VCI=20.) The cell is then transferred to the desired output circuit (ATM connection) via the ATM-SW 11.

In this way, the ATM switching apparatus 40 according to the Embodiment 4 enables to carry out switching processes for the AAL2 cell and other cells (the AAL1 cell, the AAL5 cell), and also to reduce the number of ports to be used in the ATM-SW 11.

EMBODIMENT 5

Figure 5:
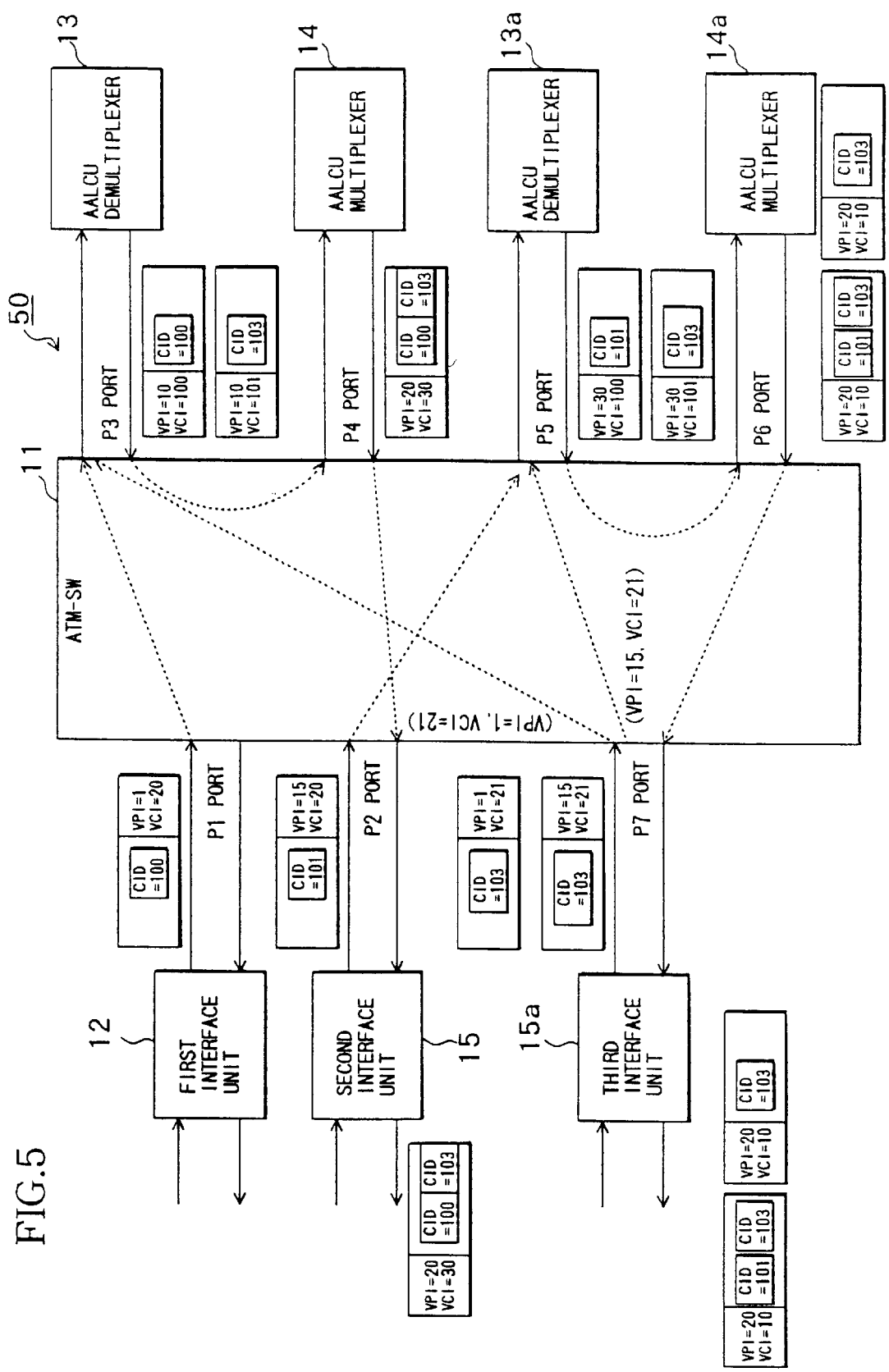
FIG. 5 is a diagram showing an ATM switching apparatus applicable to a short cell in accordance with a fifth Embodiment of the present invention.

FIG. 5 is a diagram showing an ATM switching apparatus 50 applicable to a short cell in accordance with a Embodiment 5 of the present invention. In the ATM switching apparatus 50 shown in FIG. 5, a first interface unit 12, a demultiplexer 13, a multiplexer 14, and a second interface unit 15, which are connected to an ATM-SW 11 of the ATM switching apparatus 10 shown in FIG. 1, are increased in number thereof.

Namely, the demultiplexers 13, 13a and the multiplexers 14, 14a are connected to the P3, P4, P5 and P6 ports of the ATM-SW 11. AAL2 cells inputted to the ATM-SW 11 from the first interface unit 12, the second interface unit 15, and third interface unit 15a are dispersed into one of the demultiplexers 13, 13a in accordance with the value of the VPI/VCI to be routed and processed by each demultiplexer 13, 13a, and each multiplexer 14, 14a.

For example, two kinds of AAL2 cells are inputted to the P7 port of the ATM-SW 11. In the cells inputted to the P7 port, the AAL2 cell having VPI=1, VCI=21 is routed to the demultiplexer 13 connected to the P3 port. The AAL2 cell having VPI=15, VCI=21 is routed to the demultiplexer 13a connected to the P5 port.

The following operation is almost the same as that of the Embodiment 1. Explanation thereof is, therefore, omitted. In this way, the ATM switching apparatus 50 increases the number of inputted short cell connections (the number of CID number of the short cells), and when one demultiplexer 13 or one multiplexer 14 exceeds its capacity capable of processing, entire processing capability can be enhanced by dispersing the processing loads.

EMBODIMENT 6

Figure 6:
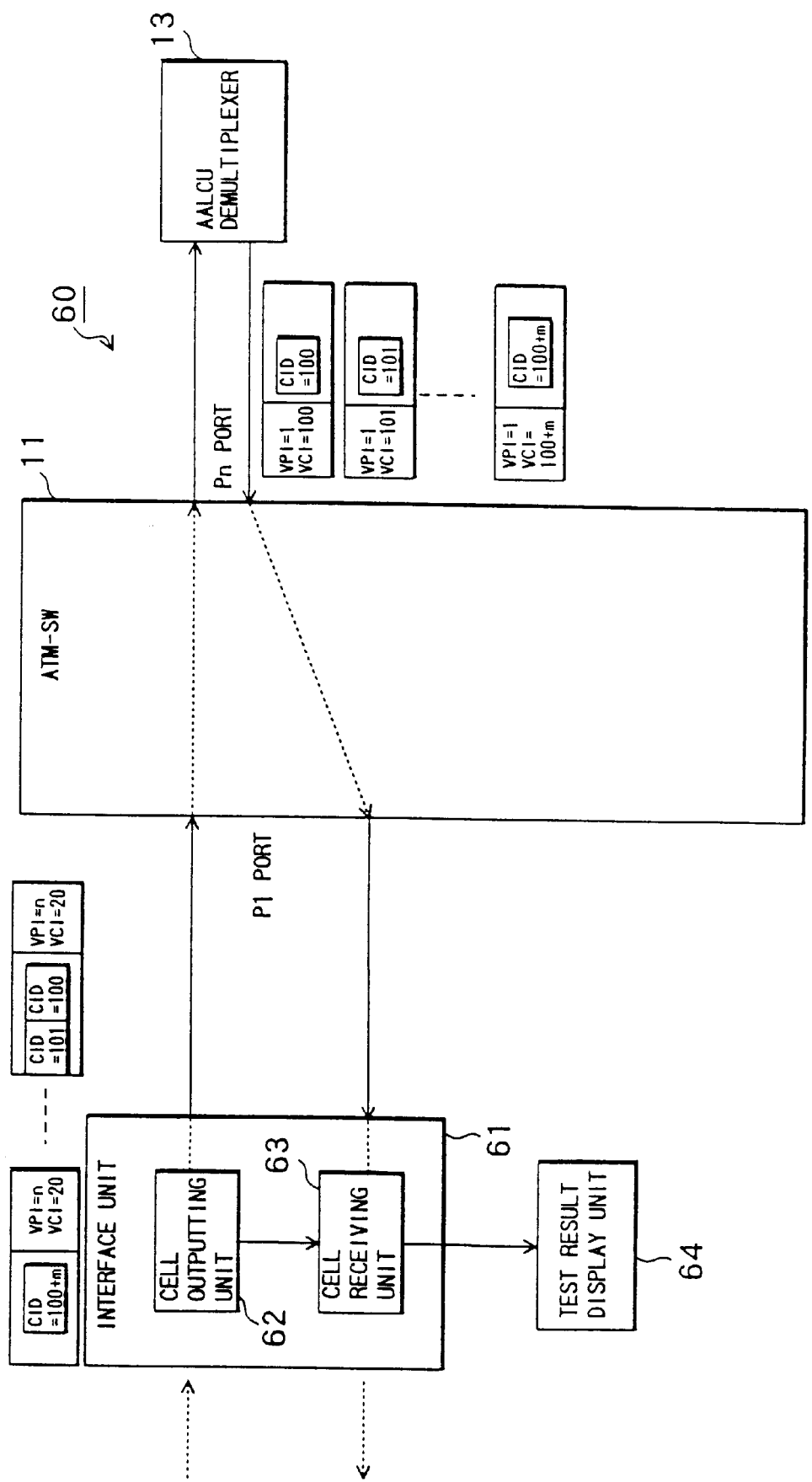
FIG. 6 is a diagram showing an ATM switching apparatus applicable to a short cell in accordance with a sixth Embodiment of the present invention.

FIG. 6 is a diagram showing an ATM switching apparatus 60 applicable to a short cell in accordance with a Embodiment 6 of the present invention. In FIG. 6, the ATM switching apparatus 60 consists of an ATM-SW 11, an interface unit 61 connected to a P1 port of the ATM-SW 11, a demultiplexer 13 connected to a Pn port of the ATM-SW 11, and a test result display unit 64 connected to the interface unit 61.

The ATM-SW 11 refers to VPI/VCI of the inputted cell, outputs a cell of VPI=n, VCI=20 from the Pn port to input a cell of VPI=n, VCI=20 to the demultiplexer 13. The ATM-SW 11 outputs cells of VPI=1, VCIs=100 to 100+m from the P1 port, and inputs cells of VPI=1, VCIs=100 to 100+m to the interface unit 61.

The interface unit 61 comprises a cell outputting unit 62, and a cell receiving unit 63. The cell outputting unit 62 produces an AAL2 cell for a continuity test. Namely, the cell outputting unit 62 produces an AAL2 cell storing a plurality of multiplexed short cells in a payload. In this case, the CID of each short cell is made to have any value of 100 to 100+m. The VPI, VCI of the AAL2 cell are set to VPI=n, VCI=20. The cell outputting unit 62 then outputs the produced AAL2 cell to the ATM-SW 11. In this case, the cell outputting unit 62 notifies the cell receiving unit 63 of the CID of each short cell stored in the AAL2 cell in outputting order The cell receiving unit 63 receives a partial fill cell outputted to the interface unit 61 from the ATM-SW 11. The cell receiving unit 63 then judges whether or not the VCI (=CID) of the received partial fill cell is coincide with a notified content from the cell outputting unit 62. Thus, the cell receiving unit 63 decides whether or not the partial fill cell storing the short cell outputted from the cell outputting unit 62 has arrived at. The cell receiving unit 63 then provides a decision result to the test result display unit 64.

When the test result display unit 64 receives the decision result (normal decision) notifying that the partial fill cell has appropriately arrived, the test result display unit 64 displays the result. Meanwhile, when the test result display unit 64 receives the decision result (error decision) notifying that no partial fill cell has appropriately arrived, the test result display unit 64 displays the result. The test result display unit 64 may display the test result by lighting on a lamp, including an LED, and may display the test result on a display device, including a cathode ray tube (CRT), a liquid crystal display (LCD) or a display device, or may display the test result by voice. In addition, the test result display unit 64 may display the test result only when the test result display unit 64 receives the error decision.

The demultiplexer 13 has the same arrangement as that of the demultiplexer 13 of the Embodiment 1. In this case, the demultiplexer 13 produces a plurality of partial fill cells from the AAL2 cell inputted from the ATM-SW 1, and sets the VPI to VPI=1, and also sets VCI to the same number as that of the CID of the short cell. Each partial fill cell is then sent to the ATM-SW 11.

In the ATM switching apparatus 60, the cell outputting unit 62 of the interface unit 61 produces a plurality of AAL2 cells storing each short cell having CIDs=100 to 100+m, and outputs a plurality of the AAL2 cells to the ATM-SW 11. The ATM-SW 11 refers to the VPI/VCI of each AAL2 cell inputted from the interface unit 61 and outputs the VPI/VCI of each AAL2 cell to the demultiplexer 13.

The demultiplexer 13 produces the partial fill cells equivalent to the number of short cells (1+m short cells), stores each partial fill cell in the short cells, sets the VCI of each partial fill cell to the same number as that of CID, sets VPI to VPI=1, and inputs each partial fill cell to the ATM-SW 11.

The ATM-SW 11 outputs each partial fill cell to the interface unit 61 in accordance with the VPI/VCI of each partial fill cell. The cell receiving unit 63 of the interface unit 61 receives each partial fill cell outputted from the ATM-SW 11, and decides whether the number of partial fill cells is 1+m or not, and whether the number of VCI (=CIDs) of the partial fill cells is 100 to 100+m or not, and provides the decision result to the test result display unit 64. The test result display unit 64 displays the decision result (normal decision or error decision).

The ATM switching apparatus 60 can carry out tests for deciding whether the ATM-SW 11 and the demultiplexer 13 are in normal operation or not (the test for deciding whether conversion to partial fill cells from the AAL2 cells is conducted under normal or not, the continuity test.)

EMBODIMENT 7

Figure 7:
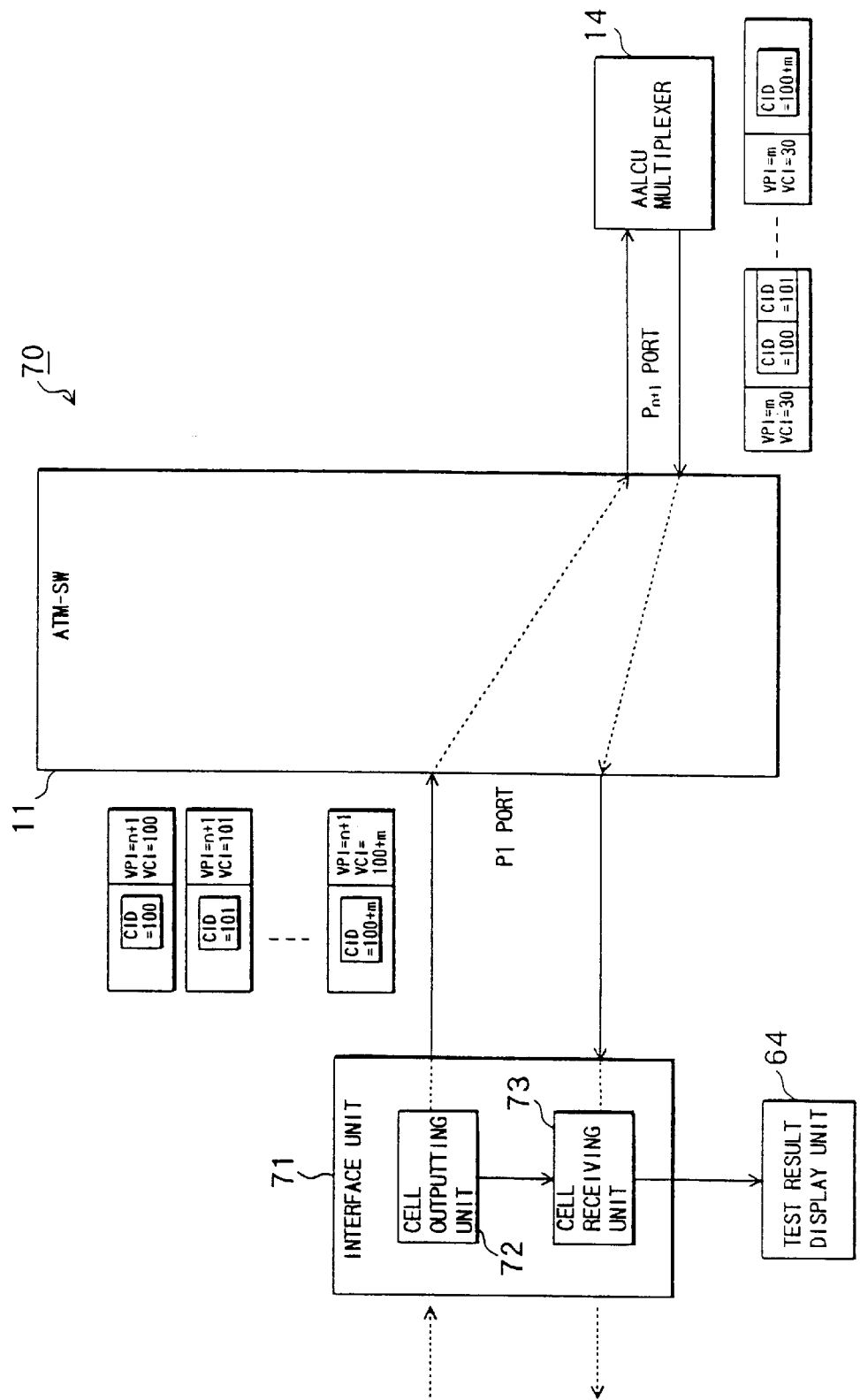
FIG. 7 is a diagram showing an ATM switching apparatus applicable to a short cell in accordance with a seventh Embodiment of the present invention.

FIG. 7 is a diagram showing an ATM switching apparatus 70 applicable to a short cell in a Embodiment 7 of the present invention. In FIG. 7, the ATM switching apparatus 70 consists of an ATM-SW 11, an interface unit 71 connected to the P1 port of the ATM-SW 11, a multiplexer 14 connected to the Pn+1 port of the ATM-SW 11, a test result display unit 64 connected to the interface unit 71.

The ATM-SW 11 refers to the VPI of the inputted cell, outputs the cells of VPI=n+1, VCIs=100 to 100+m from the Pn+1 port and inputs the cells of the VPI=n+1, VCIs=100 to 100+m to the multiplexer 14. Meanwhile, the ATM-SW 11 outputs the cell of VPI=m, VCI=30 from the P1 port, and inputs the cell of VPI=m, VCI=30 to the interface unit 71.

The interface unit 71 comprises a cell outputting unit 72, and a cell receiving unit 73. The cell outputting unit 72 produces a partial fill cell for a continuity test. Namely, the cell outputting unit 72 produces 1+m pieces of partial fill cells storing a plurality of short cells having CIDs=100 to 100+m and sets the VPI of each partial fill cell to VPI=n+1, and sets VCI to the same number as that of the CID of the short cell, and outputs each partial fill cell to the ATM-SW 11. In this case, the cell outputting unit 72 notifies the cell receiving unit 73 of the VCI (=CID) of each short cell in outputting order.

The cell receiving unit 73 receives the AAL2 cell outputted from the ATM-SW 11 to the interface unit 71. The cell receiving unit 73 then decides whether the CID of the short cell stored in the received AAL2 cell is coincide with the notified content from the cell outputting unit 72 or not. Thus, the cell receiving unit 73 decides whether the AAL2 cell storing the short cell outputted from the cell outputting unit 72 has arrived or not. The cell receiving unit 73 then provides the decided result to the test result display unit 64.

The test result display unit 64 is the same as that described in the Embodiment 6.

The multiplexer 14 has the same arrangement as that of the multiplexer 14 of the Embodiment 1 of the present invention. In this case, the multiplexer 14 produces a plurality of AAL2 cells formed by multiplexing a plurality of short cells stored in the partial fill cell inputted from the ATM-SW 11 on the payload. The multiplexer 14 sets the VPI of the AAL2 cell to VPI=m, sets VCI to VCI=30, and outputs each AAL2 cell to the ATM-SW 11.

In the ATM switching apparatus 70, the cell outputting unit 72 of the interface unit 71 produces a plurality of partial fill cells storing each short cell having CIDs=100 to 100+m, and outputs a plurality of the partial fill cells to the ATM-SW 11. The ATM-SW 11 refers to the VPI/VCI of each partial fill cell inputted from the interface unit 71, and outputs each partial fill cell to the multiplexer 14.

The multiplexer 14 produces a plurality of AAL2 cells storing 1+m pieces of short cells, sets the VPI of each AAL2 cell to VPI=m, sets VCI to VCI=30, and inputs each AAL2 cell to the ATM-SW 11.

The ATM-SW 11 outputs each AAL2 cell to the interface unit 71 in accordance with the VPI/VCI of each AAL2 cell. The cell receiving unit 73 of the interface unit 71 receives each AAL2 cell outputted from the ATM-SW 11, decides whether the CIDs of a plurality of short cells stored in a plurality of the AAL2 cells are CIDs=100 to 100+m or not, and provides the decided result to the test result display unit 64. The test result display unit 64 displays the decided result (normal decision, or error decision).

The ATM switching apparatus 70 can carry out tests for deciding whether the ATM-SW 11 and the multiplexer 14 are in normal operation or not (the test for deciding whether conversion to the AAL2 cell from the partial fill cell is under normal or not, the continuity test.)

In the Embodiments 6 and 7, the good-or-bad decision is carried out by referring to the number of short cells and the values of CIDs. However, the following arrangement may be acceptable.

The cell outputting unit 62 (72) notifies the cell receiving unit 63 (73) of the content (bit pattern) of the short cell outputted by the cell outputting unit 62 (72). The cell receiving unit 63 (73) calculates the expected value (predicted value) of the bit pattern of the short cell to be received using the bit pattern, and contrasts the bit pattern of the actually received short cell with the expected value to decide the good or bad result of the continuity test (bit error).

In addition, the following arrangement may be acceptable. The expected value of the bit pattern of the ATM cell received by the cell receiving unit 63 (73) is calculated from the bit pattern of the ATM cell outputted from the cell outputting unit 63 (73). The good or bad result (bit error) of the continuity test is decided by contrasting the bit pattern of the ATM cell actually received by the cell receiving unit 63 (73) with its expected value.

EMBODIMENT 8

Figure 8:
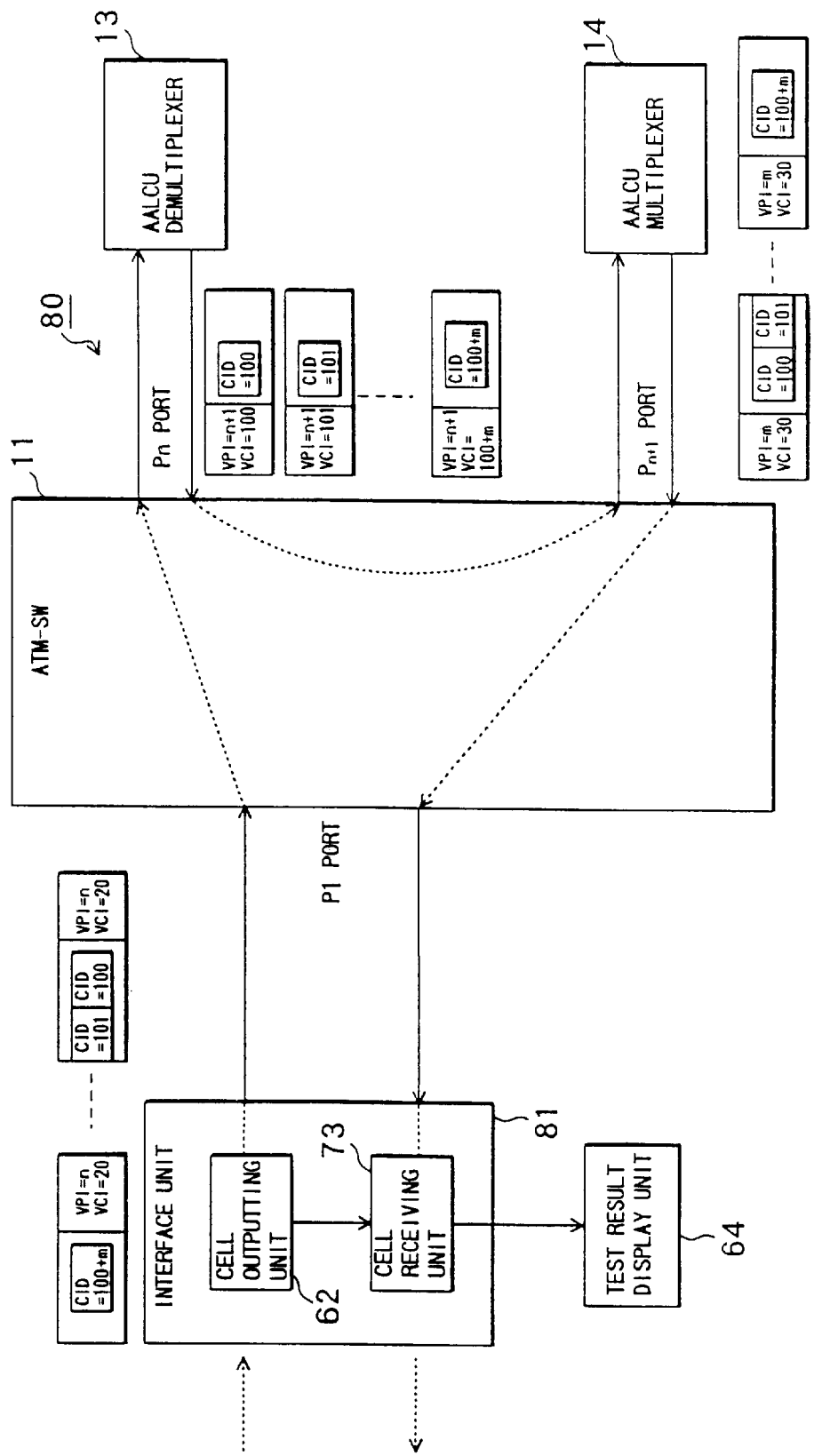
FIG. 8 is a diagram showing an ATM switching apparatus applicable to a short cell in accordance with an eighth Embodiment of the present invention.

FIG. 8 is a diagram showing an ATM switching apparatus 80 applicable to a short cell in accordance with an Embodiment 8 of the present invention. In FIG. 8, an ATM switching apparatus 80 consists of an ATM-SW 11, an interface unit 81 connected to the P1 port of the ATM-SW 11, a demultiplexer 13 connected to the Pn port of the ATM-SW 11, a multiplexer 14 connected to the Pn+1 port of the ATM-SW 11, and a test result display unit 64 connected to the interface unit 81. The interface unit 81 comprises a cell outputting unit 62 shown in FIG. 6, and a cell receiving unit 73 shown in FIG. 7.

The operation of the ATM switching apparatus 80 is described below. Namely, the cell outputting unit 62 produces a plurality of AAL2 cells, and outputs a plurality of the AAL2 cells to the ATM-SW 11, and then provides the VPIs, VCIs, CIDs of the AAL2 cells to the cell receiving unit 73. The cell receiving unit 73 previously calculates the expected values of the VPIs, VCIs, and CIDs of the receiving AAL2 cells using the VPIs, VCIs, and CIDs received from the cell outputting unit 62. The cell receiving unit 73 then decides whether the VPIs, VCIs, and CIDs of the AAL2 cells actually received from the ATM-SW 11 are the same values as those of the expected values or not. The decided result of the cell receiving unit 73 is displayed on the test result display unit 64. The operation of the ATM switching apparatus 80 is the same as that of the ATM switching apparatus 10 shown in the Embodiment 1 (see FIG. 1) except the above points.

The ATM switching apparatus 80 shown in FIG. 8 is of an example in which the VPI, the VCI, and the CID of the cell outputted from the cell outputting unit 62 are the different values as those of the cell received by the cell receiving unit 73.

The ATM switching apparatus 80 can carry out a test for deciding whether the ATM-SW 11, the demultiplexer 13, and the multiplexer 14 are in normal operation or not (a test for deciding whether conversion from the AAL2 cell to the partial fill cell to the AAL2 cell has been normally done or not). The following may be acceptable. The ATM switching apparatus 10 in the Embodiment 1 (see FIG. 1) is provided with the cell outputting unit 62, and the cell receiving unit 73. The above test is carried out before carrying out the operation described in the Embodiment 1.

EMBODIMENT 9

Figure 9:
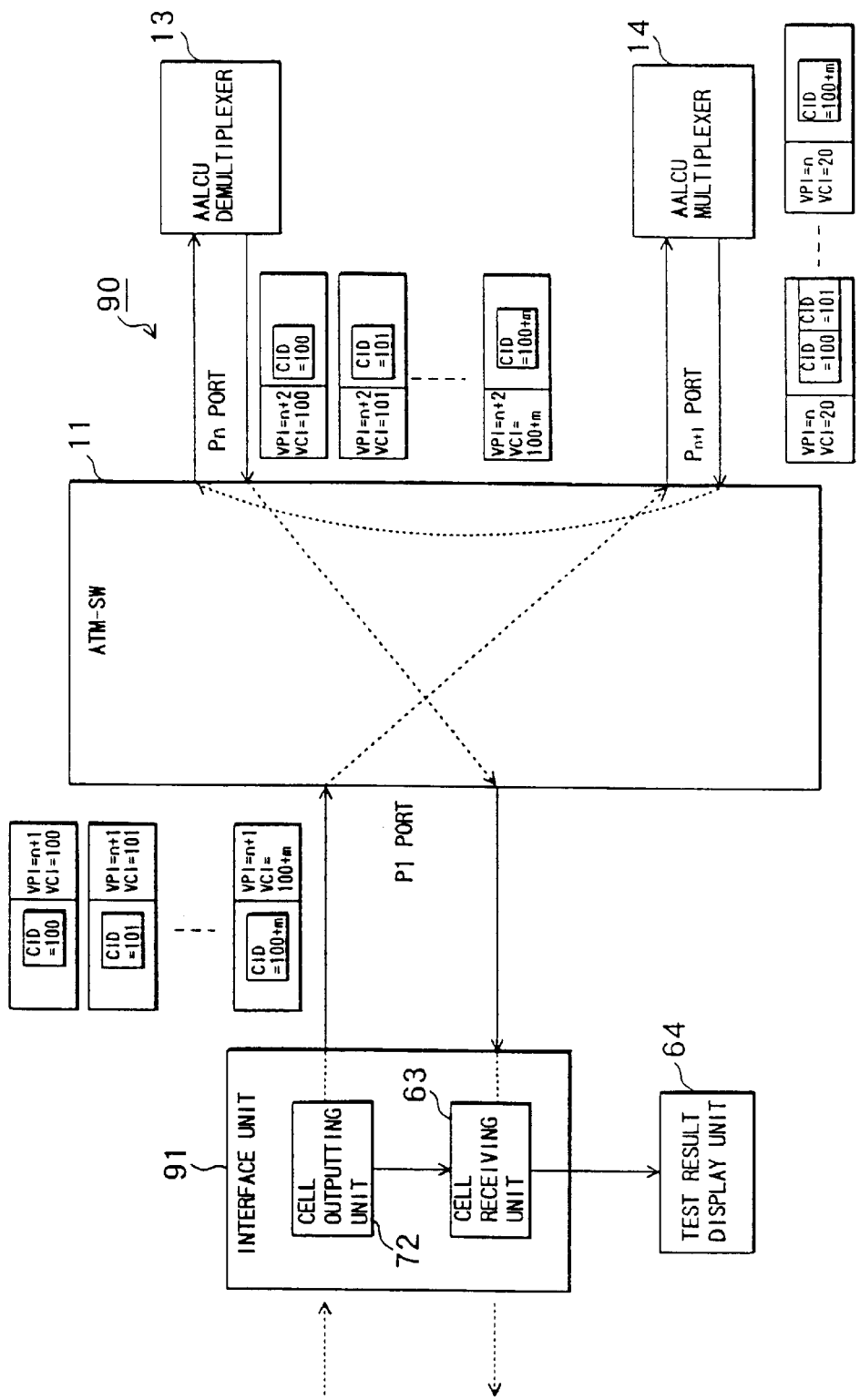
FIG. 9 is a diagram showing an ATM switching apparatus applicable to a short cell in accordance with a ninth Embodiment of the present invention.
Figure 10:
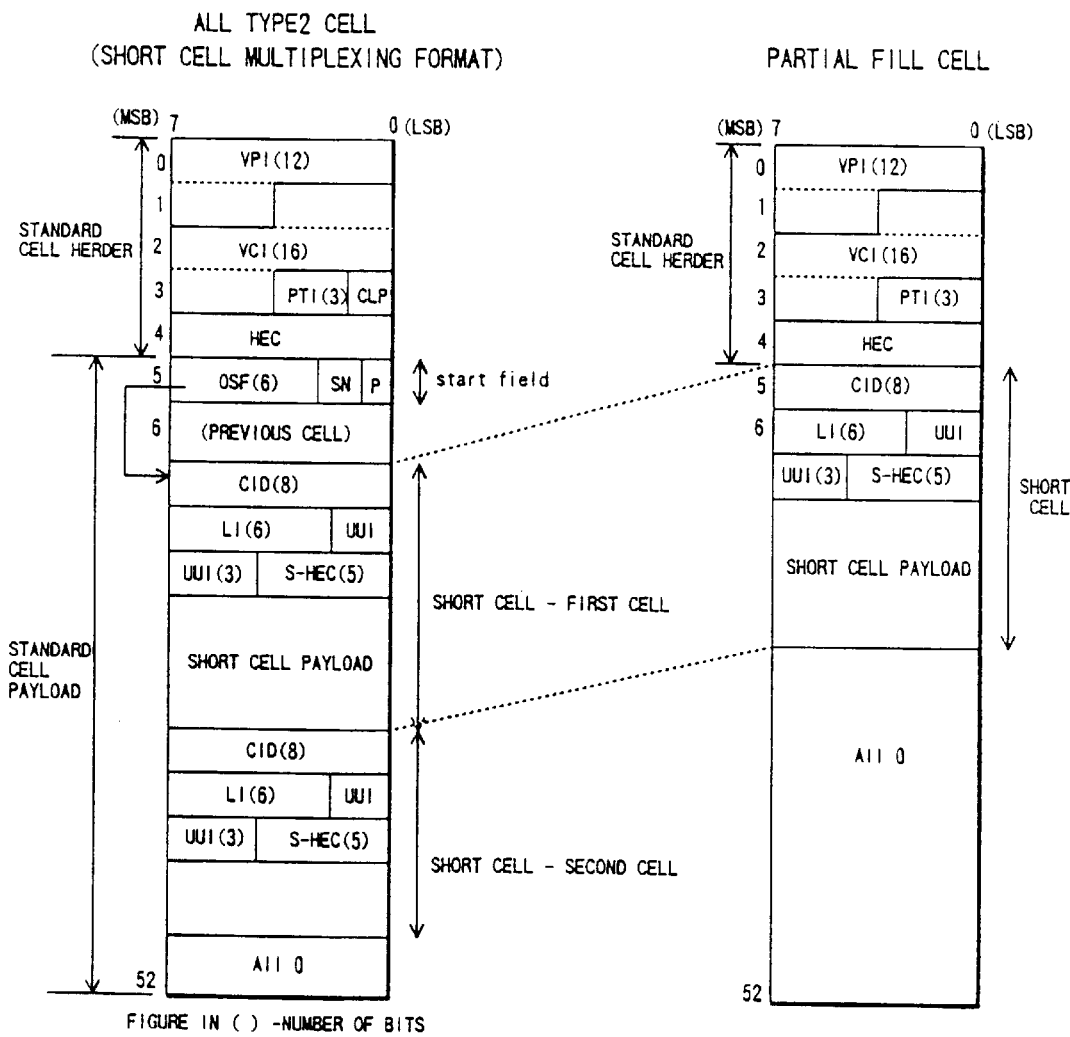
FIG. 10 is a diagram illustrating formats of AAL Type 2 cell and a format of a partial fill cell.
Figure 12:
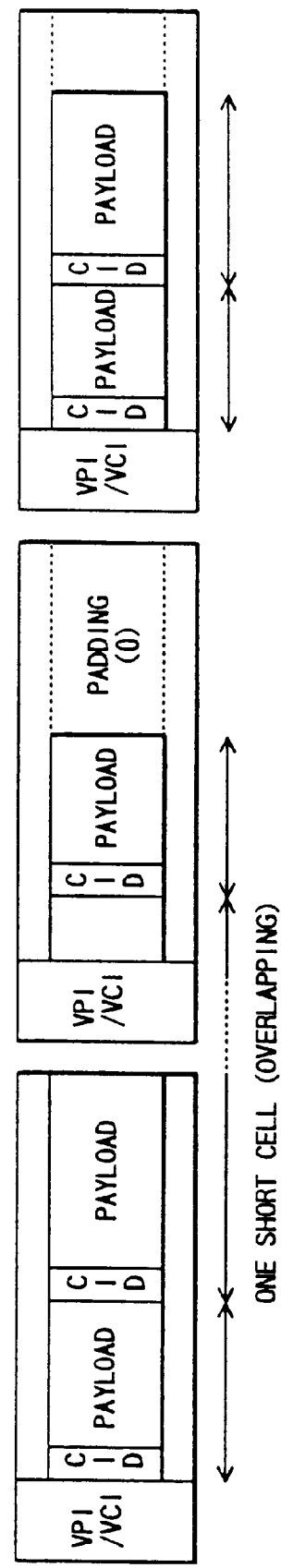
FIG. 12 is a diagram showing a concept of a transfer system of AAL Type 2 cell.

FIG. 9 is a diagram showing an ATM switching apparatus 90 applicable to a short cell in accordance with a Embodiment 9 of the present invention. In FIG. 9, the ATM switching apparatus 90 has the same arrangemnt as that of the ATM switching apparatus 80 shown in FIG. 8 except the following points. Namely, an interface unit 91 is provided with a cell receiving unit 63 and a cell outputting unit 72 instead of the cell outputting unit 62, and the cell receiving unit 73 shown in FIG. 8. An ATM-SW 11 inputs the cell inputted from the interface unit 91 to the multiplexer 14, inputs the cell inputted from a multiplexer 14 to the demultiplexer 13, and inputs the cell inputted from a demultiplexer 13 to the interface unit 91.

The ATM switching apparatus 90 can carry out a test for deciding whether conversion from the partial fill cell to the AAL2 cell to the partial fill cell has normally been done or not. In this case, the following may be acceptable. The ATM switching apparatus 10 in the Embodiment 1 (see FIG. 1) is provided with the cell outputting unit 72 and the cell receiving unit 63. The above test is carried out before carrying out the operation described in the Embodiment 1.

It should be noted that the Embodiments 6–9 show the examples in which the cell outputting unit and the cell receiving unit are provided in the same interface unit. The cell outputting unit and the cell receiving unit may be provided in an individual interface unit, respectively. The cell outputting unit and the cell receiving unit may be provided separately from the interface unit.

What is claimed is:

1. An ATM switching apparatus applicable to a short cell, comprising:

an ATM switch to output an ATM cell to an output path corresponding to an identifier of the ATM cell;

an interface unit to output the ATM cell having a plurality of short cells to said ATM switch;

a demultiplexer to receive the ATM cell outputted from said interface unit through said ATM switch to produce a plurality of ATM cells, each of which includes one short cell, and output the ATM cells to said ATM switch; and a multiplexer to receive a plurality of ATM cells outputted from said demultiplexer through said ATM switch to produce the ATM cell having a plurality of short cells in accordance with the identifiers of the ATM cells, and outputs the ATM cell to said ATM switch, while setting the identifier of the produced ATM cell so that the ATM cell is outputted from a predetermined output path of said ATM switch, wherein said interface unit sets an identifier of the ATM cell so that the ATM cell is outputted to said demultiplexer, said demultiplexer sets the identifiers of the ATM cells so that the ATM cells are outputted to said multiplexer.

2. A method of routing a short cell in an ATM switching apparatus comprising an ATM switch, an interface unit, a demultiplexer, and a multiplexer, said interface unit, said demultiplexer, and said multiplexer being connected to the ATM switch, comprising:

outputting by said interface unit an ATM cell having a plurality of short cells to said ATM switch, while setting an identifier of the ATM cell so that the ATM cell is outputted to said demultiplexer;

outputting by said ATM switch the ATM cell outputted from said interface unit to said demultiplexer in accordance with the identifier of the ATM cell;

producing by said demultiplexer a plurality of ATM cells, each of which includes one short cell, and outputting the ATM cells to said ATM switch, while setting the identifiers of the ATM cells so that the ATM cells are outputted to said multiplexer;

outputting by said ATM switch each ATM cell outputted from said demultiplexer to said multiplexer in accordance with its identifier;

producing by said multiplexer a ATM cell in which a plurality of the short cells are stored in accordance with the identifiers of the ATM cells outputted from said ATM switch, and outputting the ATM cell to said ATM switch, while setting the identifier of the produced ATM cell so that the ATM cell is outputted from a predetermined output path of said ATM switch; and outputting by said ATM switch the ATM cells inputted from said multiplexer from a given output path of said ATM switch in accordance with its identifier.

3. An ATM switching apparatus applicable to a short cell, comprising:

an ATM switch to output an ATM cell to an output path corresponding to an identifier of the ATM cell;

an interface unit to output the ATM cell having a plurality of short cells to said ATM switch;

a demultiplexer to receive the ATM cell outputted from said interface unit through said ATM switch to produce a plurality of ATM cells, each of which includes one short cell, and output the ATM cells to said ATM switch; and a multiplexer to receive a plurality of ATM cells outputted from said demultiplexer through said ATM switch to produce the ATM cell having a plurality of short cells in accordance with the identifier of each short cell, and outputs the ATM cell to said ATM switch, while setting the identifier of the produced ATM cell so that the ATM cell is outputted from a predetermined output path of said ATM switch, wherein said interface unit sets an identifier of the ATM cell so that the ATM cell is outputted to said demultiplexer, said demultiplexer sets the identifiers of the ATM cells so that the ATM cells are outputted to said multiplexer.

4. A method of routing a short cell in an ATM switching apparatus comprising an ATM switch, an interface unit, a demultiplexer, and a multiplexer, said interface unit, said demultiplexer, and said multiplexer being connected to the ATM switch, comprising:

outputting by said interface unit an ATM cell having a plurality of short cells to said ATM switch, while setting an identifier of the ATM cell so that the ATM cell is outputted to said demultiplexer;

outputting by said ATM switch the ATM cell outputted from said interface unit to said demultiplexer in accordance with the identifier of the ATM cell;

producing by said demultiplexer a plurality of ATM cells, each of which includes one short cell, and outputting the ATM cells to said ATM switch, while setting the identifiers of the ATM cells so that the ATM cells are outputted to said multiplexer;

outputting by said ATM switch each ATM cell outputted from said demultiplexer to said multiplexer in accordance with its identifier;

producing by said multiplexer a ATM cell in which a plurality of the short cells are stored in accordance with the identifier of each short cell, and outputting the ATM cell to said ATM switch, while setting the identifier of the produced ATM cell so that the ATM cell is outputted from a predetermined output path of said ATM switch; and outputting by said ATM switch the ATM cells inputted from said multiplexer from a given output path of said ATM switch in accordance with its identifier.

5. An ATM switching apparatus applicable to a short cell, comprising:

an ATM switch for outputting a ATM cell inputted thereinto from an output path corresponding to an identifier of the ATM cell; an interface unit; and a multiplexer/demultiplexer, said interface unit and said multiplexer/demultiplexer being connected to the ATM switch, wherein:

said interface unit outputs, when a ATM cell storing a plurality of short cells is inputted to said interface unit, the ATM cell to said ATM switch, while setting an identifier of the ATM cell so that the ATM cell is outputted to said multiplexer/demultiplexer;

said multiplexer/demultiplexer comprises:
a distributing unit;
a demultiplexing unit; and a multiplexing unit, said demultiplexing unit and said multiplexing unit being connected to said distributing unit;

said distributing unit outputs, when the ATM cell outputted from said ATM switch is inputted, the ATM cell to any one of said demultiplexing unit or said multiplexing unit in accordance with the identifier of the ATM cell, said demultiplexing unit receives the ATM cell outputted from said distributing unit to produce a plurality of ATM cells in which a plurality of short cells stored in the ATM cell are stored one by one, and outputs the ATM cells to said ATM switch, while setting the identifiers of the ATM cells so that the ATM cells are outputted from a predetermined output path; and said multiplexing unit receives a plurality of the ATM cells outputted from said demultiplexing unit through said ATM switch to produce a ATM cell in which a plurality of the short cells stored in accordance with identifiers of the ATM cells, and outputs the ATM cell to said ATM switch, while setting the identifier of the produced ATM cell so that the ATM cell is outputted from a predetermined output path of said ATM switch.

6. A method of routing a short cell in an ATM switching apparatus comprising an ATM switch, an interface unit, and a multiplexer/demultiplexer, said interface unit and said multiplexer/demultiplexer being connected to the ATM switch and multiplexer/demultiplexer including a distributing unit, a demultiplexing unit, and a multiplexing unit, said demultiplexing unit and said multiplexing unit being connected to said distributing unit, comprising the steps of:

outputting, when the ATM cell storing a plurality of short cells is inputted, the ATM cell to said ATM switch from said interface unit, while setting an identifier of the ATM cell so that said ATM cell is outputted to said multiplexer/demultiplexer, outputting the ATM cell outputted from said interface unit to said multiplexer/demultiplexer in accordance with the identifier of the ATM cell;

outputting the ATM cell outputted from said ATM switch to said demultiplexing unit via said distributing unit in accordance with the identifier of the ATM cell;

producing, in said demultiplexing unit, a plurality of ATM cells, each of which includes one short cell from the ATM cell outputted from said distributing unit and outputting the ATM cells to said ATM switch, while setting the identifiers of the ATM cells so that the ATM cells are outputted to said multiplexing unit;

outputting each ATM cell outputted from said demultiplexing unit to said ATM switch in accordance with an identifier of the ATM cell;

outputting each ATM cell outputted from said ATM switch to said multiplexing unit via said distributing unit in accordance with the identifier of the ATM cell;

producing a ATM cell in which a plurality of the short cells are stored in accordance with the identifiers of the ATM cells outputted from said distributing unit, and outputting the ATM cell to said ATM switch, while setting an identifier of the produced ATM cell so that the ATM cell is outputted from a predetermined output path of said ATM switch; and outputting the ATM cell inputted from said multiplexing unit from a given output path of said ATM switch in accordance with its identifier.

7. An ATM switching apparatus switching cells including short cells comprising:

a demultiplexer producing, from one cell including a plurality of short cells, a plurality of cells, each of which includes one short cell; and a multiplexer producing, from the plurality of cells, one or more new cells, each of which includes one or more short cells.

8. An ATM switching apparatus according to claim 7, wherein said demultiplexer transmits each cell including one short cell while setting an identifier having a value repre senting that a cell should be transferred to said multiplexer on each cell, and each cell reaches said multiplexer based on the identifier via an ATM switch.

9. An ATM switching apparatus according to claim 8, wherein each short cell has a short cell connection identifier to identify short cell connections.

10. An ATM switching apparatus according to claim 9, wherein said multiplexer produces a new cell including a plurality of multiplexed short cells based on the identifier or the short cell connection identifier.

11. An ATM switching apparatus according to claim 9, wherein said demultiplexer sets the identifier on each cell including one short cell based on the short cell connection identifier included in said one short cell.

* * * * *

UNITED STATES PATENT AND TRADEMARK OFFICE
CERTIFICATE OF CORRECTION

PATENT NO. : 6,757,254 B2
DATED : June 29, 2004
INVENTOR(S) : H. Ono

It is certified that error appears in the above-identified patent and that said Letters Patent is hereby corrected as shown below:

<u>Title page,</u>
Item [56], References Cited, FOREIGN PATENT DOCUMENTS, should read as follows:

-- FOREIGN PATENT DOCUMENTS

JP          8-186576      7/1996 --

Signed and Sealed this

Twenty-eighth Day of December, 2004

JON W. DUDAS
*Director of the United States Patent and Trademark Office*